United States Patent [19]

Knupp

[11] Patent Number: 5,278,772
[45] Date of Patent: Jan. 11, 1994

[54] REAL-TIME ECONOMIC LOAD ALLOCATION

[75] Inventor: Stephen L. Knupp, Wilmington, Del.

[73] Assignee: Honeywell Inc., Minneapolis, Minn.

[21] Appl. No.: 879,645

[22] Filed: May 6, 1992

[51] Int. Cl.$^5$ .......................... H02J 3/18; G05B 13/02
[52] U.S. Cl. .................................. 364/492; 364/494;
364/156; 395/907; 395/914
[58] Field of Search .................. 364/492, 494, 156;
395/912, 906, 907, 914, 915

[56] References Cited

U.S. PATENT DOCUMENTS

| | | | |
|---|---|---|---|
| 4,069,675 | 1/1978 | Adler et al. | 60/667 |
| 4,110,825 | 8/1978 | Fox et al. | 364/492 |
| 4,210,962 | 6/1980 | Marsh et al. | 364/156 |
| 4,607,325 | 8/1986 | Horn | 364/151 |
| 4,742,445 | 5/1988 | Watanabe | 364/492 |
| 4,745,758 | 5/1988 | Putman et al. | 60/676 |
| 4,805,114 | 2/1989 | Putman et al. | 364/494 |
| 4,912,624 | 3/1990 | Harth et al. | 364/156 |
| 4,943,003 | 7/1990 | Shimizu et al. | 364/156 |
| 5,081,591 | 1/1992 | Hanway et al. | 364/492 |

*Primary Examiner*—Thomas G. Black
*Assistant Examiner*—Tan Q. Nguyen

*Attorney, Agent, or Firm*—Arthur A. Sapelli; William Udseth

[57] ABSTRACT

The method allocates a demanded amount of power to a plurality of power output apparatus, each power output apparatus having a cost curve associated therewith, such that each of the power output apparatus supplies a portion of the demanded power, and the total power outputted from the plurality of power output apparatus being optimally cost efficient. Data is entered for each of the power output apparatus into a controller. Solutions are generated for all possible output power demands using an optimization by parts technique within output power bounds of each of the power output apparatus. The solutions indicate the portion of power each power output apparatus is to supply to provide the total power demanded at the optimal cost efficient. The solutions are stored in tables within a storage unit of the controller. Upon receipt of a demand for power, a search is performed of the solution tables to obtain the amount of power each power output apparatus is to supply to meet the demand. Control signals are then outputted to each of the power output apparatus, the control signals being indicative of the amount of power to be supplied.

9 Claims, 5 Drawing Sheets

REAL-TIME ECONOMIC LOAD ALLOCATION

BACKGROUND OF THE INVENTION

The present invention relates to a method of control, and more particularly, to a method of real-time control of a plurality of power output apparatus for providing a predetermined power output at an optimal efficiency of the combined plurality of the power output apparatus.

In systems which have a plurality of apparatus for supplying output power, it is oftentimes necessary to make an allocation between each apparatus in terms of how much power is to be supplied by each apparatus to obtain a desired total power output. The choice of power output from each apparatus can be a simple division of the total power output desired divided by the number of apparatus. However, such a simple and straight forward approach will oftentimes result in a high inefficiency, or put another way, the cost per unit of output power will most likely not be minimal. (The unit of output power can be pounds of steam, watts, BTUs, . . . .) For example, one of the major challenges in the pulp and paper industries is the optimization of steam production rates for plant boilers. Significant cost savings result when plants are switched from a manual allocation system to a computerized allocation system. In present systems, automated solutions have been implemented on mini-computers and have been expensive to implement and provided slow and incomplete service when implemented. The present invention provides a solution to the problems of these present day systems. Thus it is desired to make an allocation of power output to be supplied by each power output apparatus such that the overall cost of the power supplied is minimal, i.e., an economic load allocation of the power output apparatus, and on a real-time basis.

In the preferred embodiment of the present invention, a method for allocating an output load between a plurality of boilers to supply steam most economically will be described; however, the method will be equally applicable to cooling towers, chillers, air conditioners, turbines, . . . .

Some present systems can only perform an economic load allocation for systems which have efficiency curves characterized by linear equations. The method of the present invention can be utilized for any algebraic efficiency characterization equation and yield a complete solution in substantially fewer iterations than previous techniques.

SUMMARY OF THE INVENTION

Therefore, there is provided by the present invention, a method for making a real-time economic load allocation. The method allocates a demanded amount of power to a plurality of power output apparatus, each power output apparatus having a cost curve associated therewith, such that each of the power output apparatus supplies portion of the demanded power. The total of the power outputted from the plurality of power output apparatus equals the amount of the demanded power. Further, the total power outputted from the plurality of power output apparatus is optimally cost efficient. The method comprises the steps of entering data for each of the power output apparatus into a controller, the data providing information about each of the power output apparatus. Solutions are generated for all possible output power demands, within output power bounds of each of the power output apparatus. The solutions indicate the portion of power each power output apparatus is to supply to provide the total power demanded at optimal cost efficiency. The solutions are stored in tables within a storage unit of the controller. Upon receipt of a demand for power, a search is performed of the solution tables to obtain the amount of power each power output apparatus is to supply, the total of the amounts of power from each power output apparatus being equal to the amount of power demanded at optimal cost efficiency. Control signals are then outputted to each of the power output apparatus, the control signals being indicative of the amount of power to be supplied.

In the preferred embodiment, the controller is a process control system which provides the control signals to a plurality of boilers for indicating the quantity of steam each boiler is to supply to the process. The solution of the present invention is performed by optimization by parts. A first and second boiler characteristics are combined to give an optimal cost curve. The combined optimal cost curve of the first and second boiler are combined with a third boiler to yield an optimal cost curve for the first, second and third boiler. The combining continues until the plurality of boilers have been optimally combined to yield the optimal solution for the plurality. This solution method results in many times fewer iterations than present techniques.

Accordingly, it is an object of the present invention to provide a method for making a real-time economic load allocation of power output apparatus.

It is another object of the present invention to provide a method for making a real-time economic load allocation of power output apparatus whereby each power output apparatus efficiency curve can have any algebraic equation characterization.

It is still another object of the present invention to provide a method for making real-time economic load allocation of power output apparatus whereby the number of iterations to provide a complete solution is relatively small.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 4, which comprises

DETAILED DESCRIPTION

Figure 1:
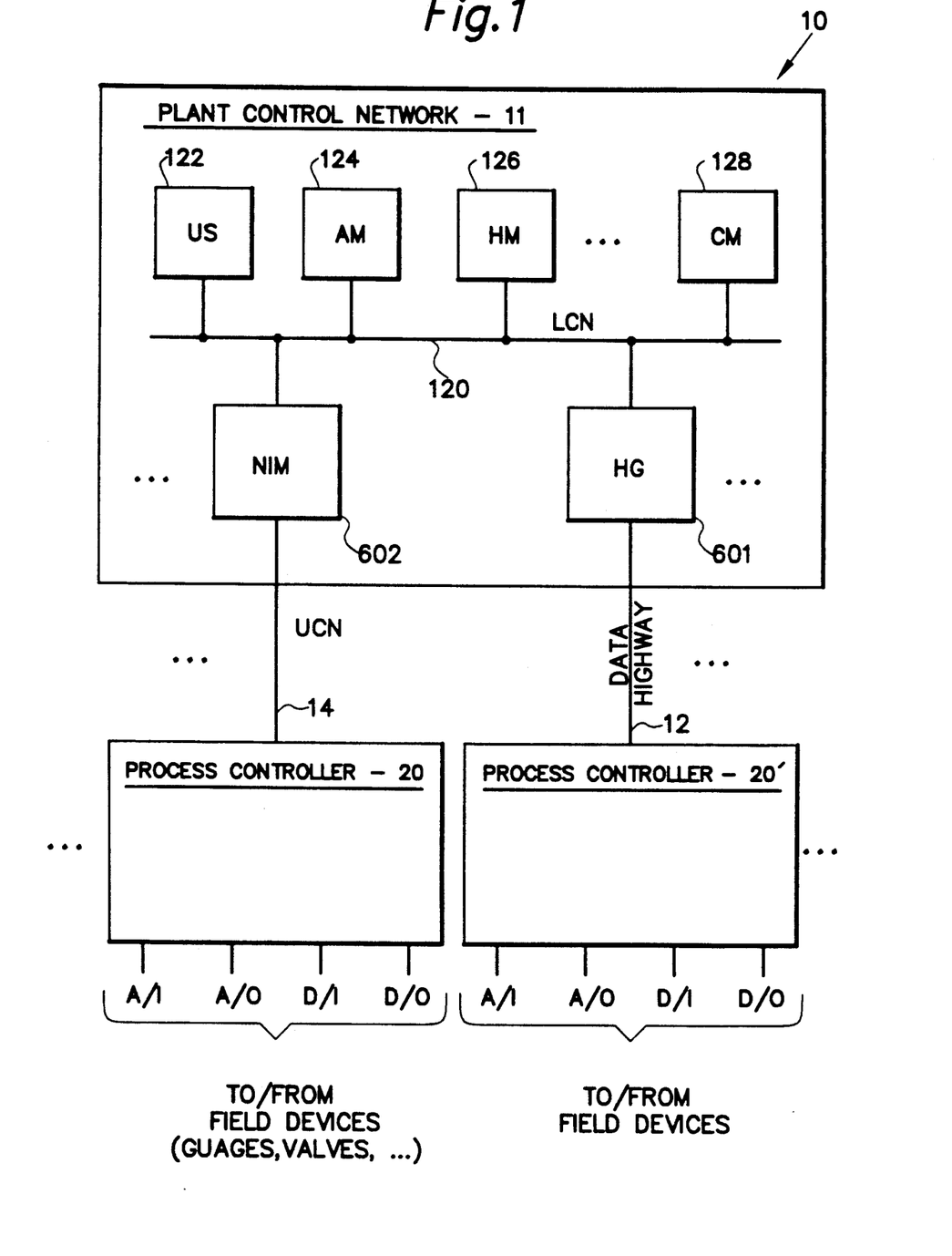
FIG. 1 shows a block diagram of the preferred embodiment of a process control system in which the present invention is utilized.

Before describing the method of the present invention, it will be helpful in understanding a process control system, and in particular, the process control system of the preferred embodiment in which the method of the present invention can be utilized. Referring to FIG. 1, there is shown a block diagram of a process control system 10. The process control system 10 includes a plant control network 11, and connected thereto is a data highway 12, which permits a process controller 20' to be connected thereto. In the present day process control system 10, additional process controller 20' can be operatively connected to the plant control network 11 via a corresponding highway gateway 601 and a corresponding data highway 12. A process controller 20, is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controllers 20, 20' interface the analog input and output signals, and digital input and output signals (A/I, A/0, D/I, and D/0, respectively) to the process control system 10 from the variety of field devices (not shown) which include valves, pressure switches, pressure gauges, thermocouples, . . . .

The plant control network 11 provides the overall supervision of the controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/-supervisory function of the process being controlled. Each of these physical modules includes a microprocessor and is operatively connected to a local control network (LCN) 120 which permits each of these modules to communicate with each other as necessary in accordance with a predetermined protocol. The NIM 602 and HG 601 provide an interface between the LCN 120 and the UCN 14, and the LCN 120 and the data highway 12, respectively. A more complete description of the plant control network 11, and the physical modules can be had by reference to U.S. Pat. No. 4,607,256, and a more complete description of the process controller 20' can be had by reference to U.S. Pat. No. 4,296,464. The process controller 20, provides similar functions to that of process controller 20' but contains many improvements and enhancements.

In the preferred embodiment of the present invention, it is desired to control a plurality of boilers (not shown) which outputs steam for the process being controlled, and more specifically, it is desired to allocate the amount of steam each boiler is to supply such that the total cost of the total steam from all the boilers is minimized. The function of allocating (i.e., the real-time economic load allocator) of the preferred embodiment of the present invention is performed by the application module (AM) 124, although it will be understood by those skilled in the art that the function can be performed by other modules of the process control system 10, including the process controller 20.

Figure 2:
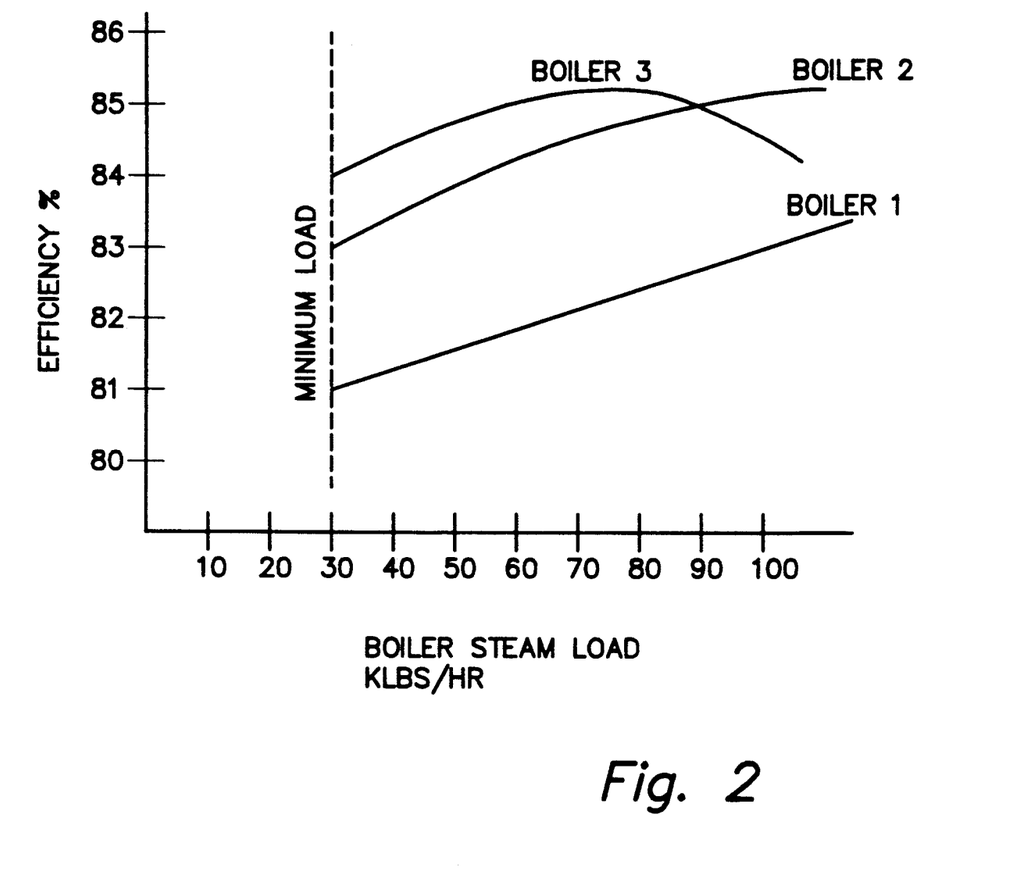
FIG. 2 shows typical efficiency curves for three boilers.

The method of the present invention will now be described. For purposes of example, the process includes six (6) boilers which are to be included in supplying steam to the process. All boilers have different cost curves due to the variety of fuels available and different operating efficiency curves. Referring to FIG. 2, there is show typical efficiency curves for three (3) boilers. These curves are typically represented as a third order polynomial equation, but the method of the present invention is not limited to such typical representations.

Figure 3:
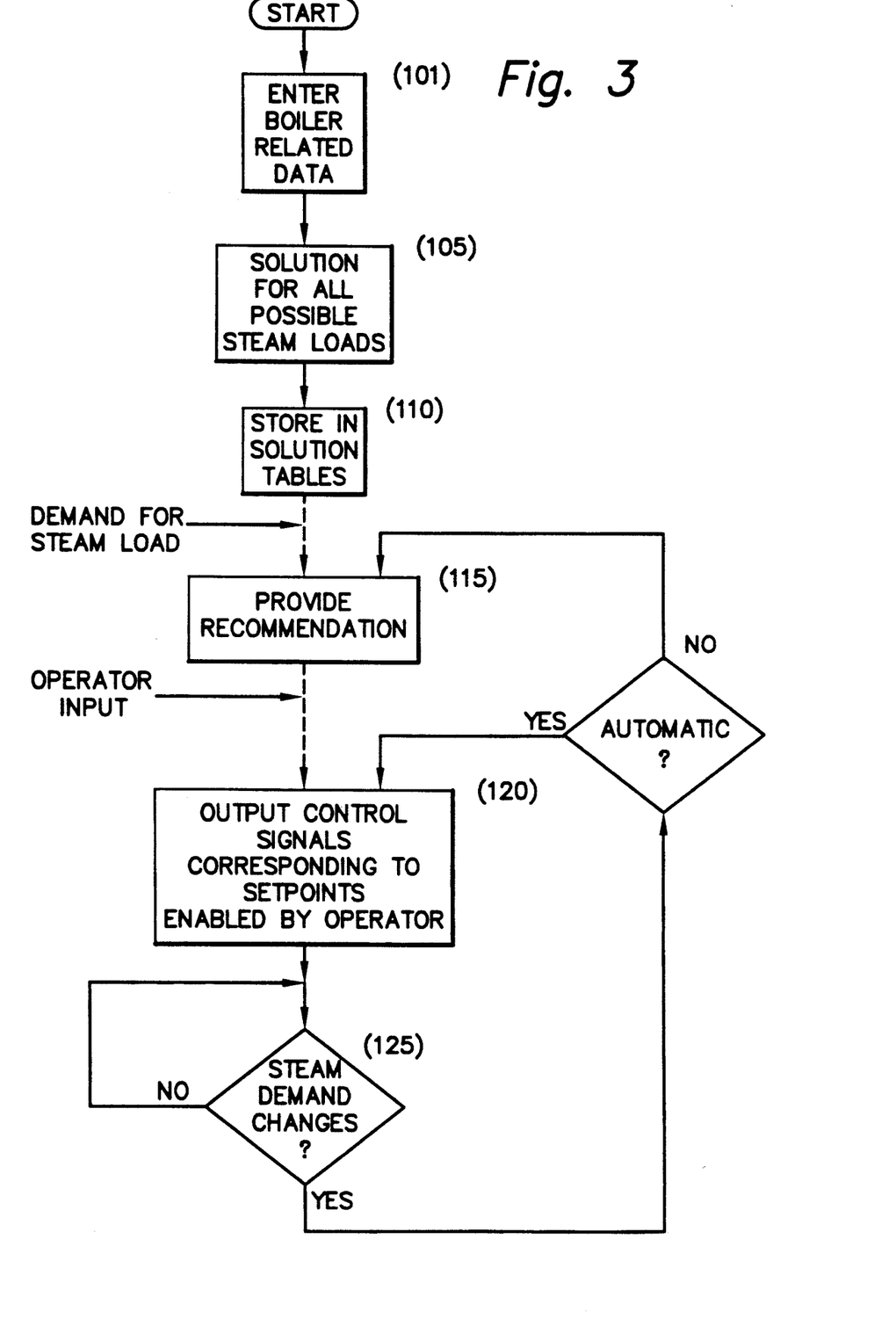
FIG. 3 shows a flow diagram outlining the setup and overall implementation of the method of the present invention.

Referring to FIG. 3, there is shown a flow diagram outlining the setup and overall implementation of the method of the present invention. In the preferred embodiment of the present invention, a user enters the fuel cost, boiler range, and efficiency parameters into the application module 124 as numeric points (block 101). This information essentially makes up the efficiency (or costs) curves referred to above. After the parameters are entered the present invention performs a setup procedure and solves for all possible steam loads, and for the special cases such as offline boilers (block 105). These solutions are stored in solution tables which are used to provide instant recommendations for any steam load solution (block 110). If any of the critical parameters such as the operating efficiency curves or fuel costs are changed, a new setup is performed and new tables created. Typically the setup procedure is completed within one minute of processing time in the preferred embodiment of the present invention. The application module, i.e., the process control system 10, is ready for the process control function. Upon receiving a demand for a steam load, the present invention searches the solution tables and provides instantaneous recommendations to load each boiler for the current steam demand (block 115). When the operator input is received enabling the optimal loading solutions (or indicating other loading desired) the information is outputted directly by the process control system or ramped over a period of time in response to the operator command. The output of the present invention interfaces directly into traditional controller schemes so that bias loads necessary are provided to minimize boiler costs or directly provide each boiler steam demand set point as is well known by those skilled in the art (block 120). As steam demands change (block 125) new control signals are outputted or if the system is in a nonautomatic mode the recommendations are provided (block 115) and an operator input awaited.

Although not shown, as the steam demand changes, the method of the present invention can provide current solutions on a real-time basis to provide the optimal load distribution for the current set of boilers, or a second "global solution"is provided which considers boilers that are to be taken off line, or placed on line. The method of the present invention determines the effects of shutting down boilers during periods of minimum demand while maintaining the required excess capacity to meet changes in the steam demand. This provides a tremendous cost savings during partial plant shutdowns. In addition the method of the present invention can determine the optimum steam load for maintenance for plant shutdowns. When a boiler is shutdown, a partial setup procedure is executed and the solution tables modified to reflect a loss of the boiler and the effects of losing an additional boiler. When the steam demand increases above the excess capacity set point, the method of the present invention will automatically recommend that the offline boiler be restarted to meet the new demand. The setup procedure is then executed and a new set of solution tables is calculated. The local optimization is calculated solutions where the same number of boilers is maintained. The global solution examines all possible distributions of the steam rate across all available boilers (except those designated as being offline for maintenance) and determines the best set of boilers to use for steam production.

The method of the present invention high speed optimization technique utilizes a Method of Optimization by Parts which guarantees that the least cost loading is always determined. Since the performance curve representing boilers are not limited to straight lines (as in the case with some types of optimization, the results of the present invention are extremely accurate). The performance curves can be of any type of algebraic equation including high order polynomials.

The determination of optimal loading of the boilers to meet a predetermined total steam load of the method of the present invention will now be described. For purposes of example only, a system having six (6) boiler will be discussed. As mentioned above, each boiler has its own characteristics resulting in a unique efficiency curve, or cost curve, the cost curve being directly related to the efficiency curve. The method of the present invention combines the cost curves of each of the boilers to obtain an optimal cost curve for the combination of all the boilers. The method uses an optimization by parts technique which combines two (2) boilers in this example, then combines that combination with another boiler, then combines that combination with yet another combination . . . . The total boilers can be expressed as a function of the total steam or f(T) where $$f(T) = G(X1, X2, X3, X4, X5, X6) = G_1(X1) + G_2(X2) + G_3(X3) + G_4(X4) + G_5(X5) + G_6(X6)$$

where
T = total steam,
Xn = steam for the boiler n, and $$N_1 \leq X1 \leq M_1$$

$$N_2 \leq X2 \leq M_2$$

$$N_3 \leq X3 \leq M_3$$

$$N_4 \leq X4 \leq M_4$$

$$N_5 \leq X5 \leq M_5$$

$$N_6 \leq X6 \leq M_6$$

$N_1, \ldots N_6$ are known, $M_1 \ldots M_6$ are known, and T (the total steam) equals $X1+X2+X3+X4+X5+X6$. In addition, $$T_{min} = N_1 + N_2 + N_3 + N_4 + N_5 + N_6$$

$$T_{max} = M_1 + M_2 + M_3 + M_4 + M_5 + M_6.$$

The functions $G_1 \ldots G_6$ are of any algebraic order or form. Typically boilers are expressed as $$G_n(X_n) = A_n X^3_n - B_n X^2_n + C_n X_n - D_n$$

$T_{min}$ (the minimum total steam)

$T_{max}$ (the maximum total steam)

The optimization used in the Method of Optimization by Parts optimizes the f(T) in accordance with the expression $$OPT [f(T)] = OPT [G_1(X1) + OPT [G_2(X2) + OPT [G_3(X3) + OPT [G_4(X4) + OPT [G_5(X5) + G_6(X6)]]]]].$$

OPT = optimize

The technique (or algorithm) of the present invention defines a new variable $S_{56} = X_5 + X_6$ $$S_{56m} = M_5 + M_6 \text{ and}$$

$$S_{56n} = N_5 + N_6.$$

It is now desired to combine or optimize the boilers 5 and 6 in accordance with the following expression. All combinations are iterated for $S_{56}$ from $S_{56n}$ to $S_{56m}$ to obtain a new function $f_{56}(S_{56})$. That results in an optimal cost curve for the combination of 56. Next, $G_4(X_4)$ is optimized with the 56 combination $$S_{456} = X_4 + S_{56}$$

$$S_{456m} = M_4 + M_{56m}$$

$$S_{456n} = N_4 + M_{56n}$$

Figure 4A:
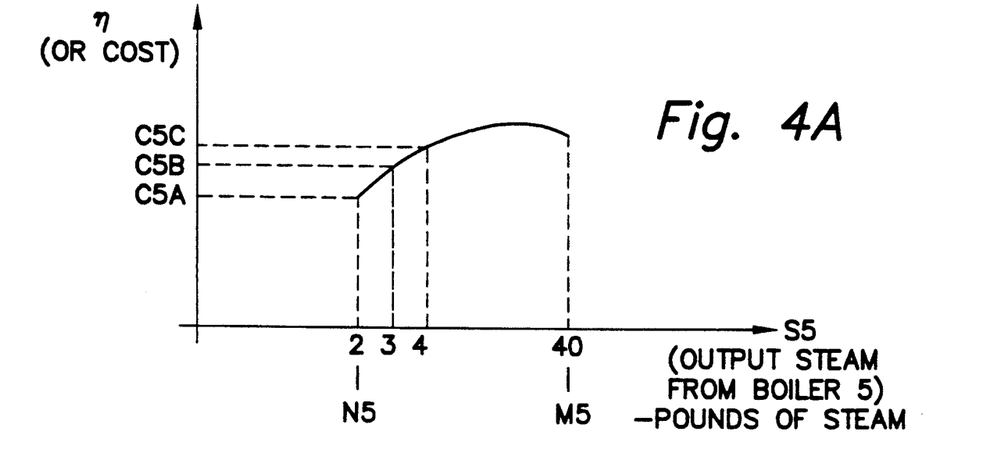
FIGS. 4A–4C, shows cost examples of cost curves for boilers 5 and 6 of an example, and an optimal cost curve for the combination.
Figure 4B:
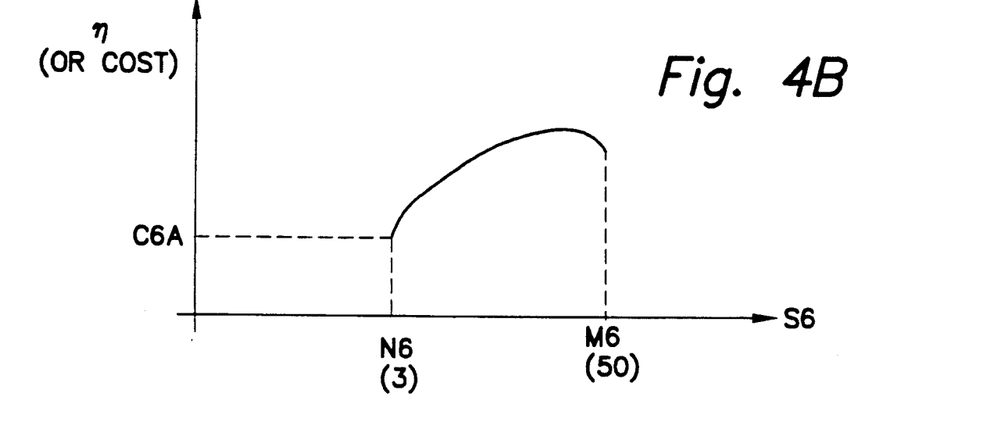
Figure 4C:
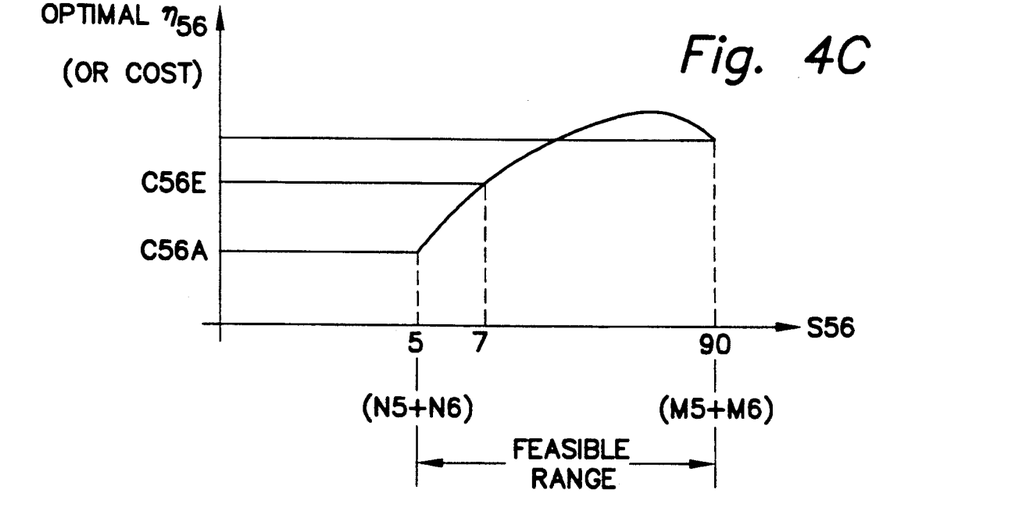

This results in combining boiler 4 with the combination of the 56 boilers to obtain a new optimal curve. This continues until all the boilers have been combined as follows $$f_{456}(S_{456}) = OPT [G_4(X_4) + f_{56}(S_{56})];$$

$$f_{3456}(S_{3456}) = OPT [G_3(X_3) + f_{456}(S_{456})];$$

$$f_{23456}(S_{23456}) = OPT [G_2(X_2) + f_{3456}(S_{3456})]; \text{ and}$$

$$f_{123456}(S_{123456}) = OPT [G_1(X_1) + f_{23456}(S_{23456})];$$

and results in five (5) solution tables which are $T_{123456}$
$T_{23456}$
$T_{3456}$
$T_{456}$
$T_{56}$ Referring to FIG. 4 which comprises FIGS. 4A, 4B, and 4C, there is shown a cost curve for boiler 5, a cost curve for boiler 6, and a cost curve for the combination of boilers 56 in accordance with the algorithm described above. The abscissa of the curve is the output steam from boiler 5 ($S_5$) in pounds of steam. The ordinate axis is the efficiency or cost. Boiler 5 in this example can output no lower that two (2) lbs of steam and no more than 40 lbs of steam, $N_5$ and $M_5$, respectively. A cost of operating the boiler 5 having an output of 2 lbs of steam is $C_{5a}$. Similarly, for outputting 3 lbs of steam the cost of operating boiler 5 is $C_{5b}$, . . . . FIG. 4B shows the cost with respect to the output steam production from boiler 6. In this example boiler 6 can output no less than 3 lbs of steam and no more than 50 lbs of steam ($N_6$ and $M_6$, respectively). When boiler 6 operates to output 3 lbs of steam the cost associated with operating boiler 6 is $C_{6a}$. The optimization by parts method combines the cost curves of boiler 5 and boiler 6 to arrive at a combined cost curve $T_{56}$ shown in FIG. 4C.

Figure 5:
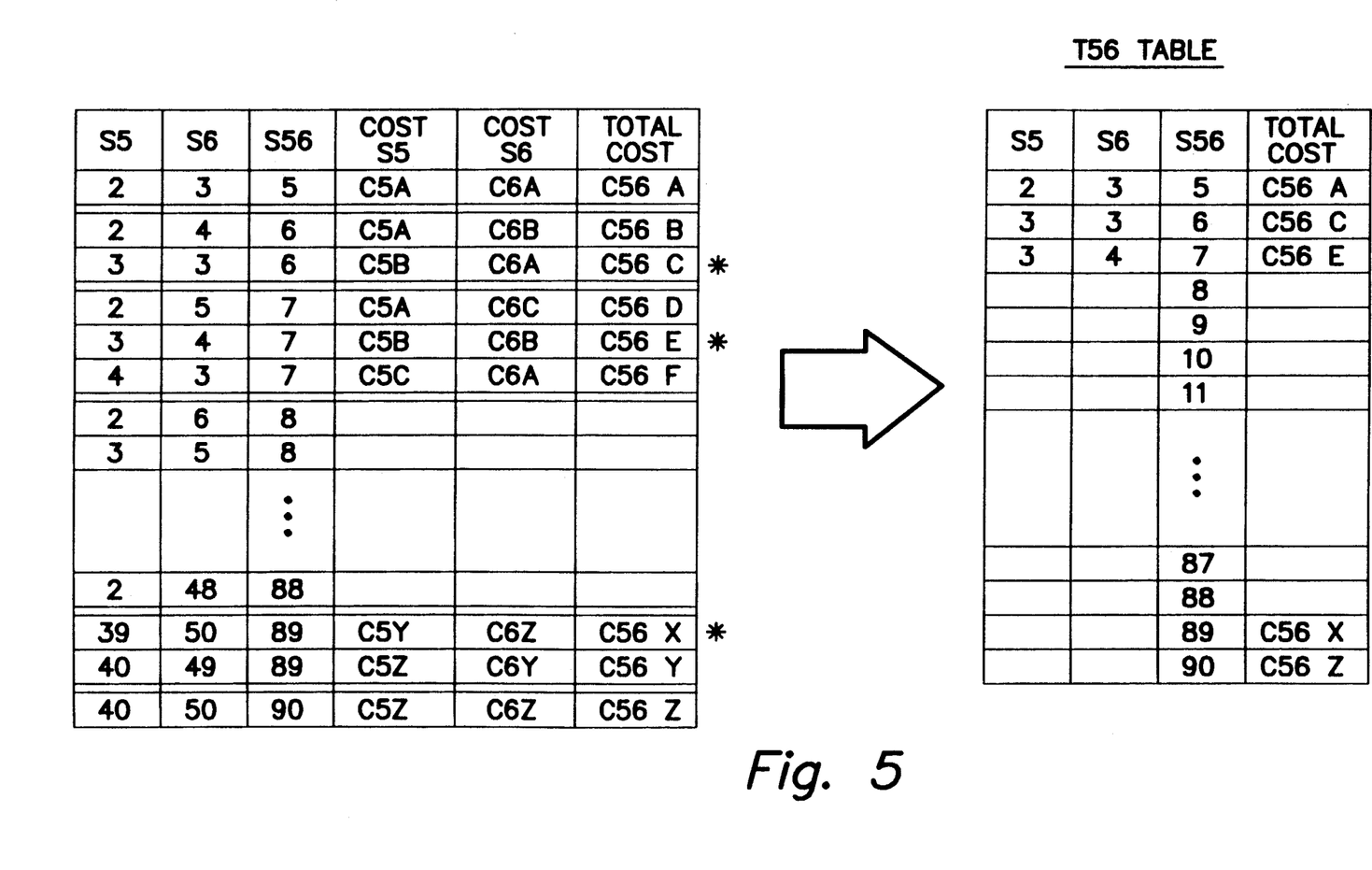
FIG. 5 shows an example of the generation of the boiler 5/6 optimal cost combination solution table, which is depicted in the optimal cost curve of FIG. 4C.

The curve is derived by a combination shown in FIG. 5. Referring to FIG. 5, the points of the combination curve is shown. The minimum that the combination can output is 5 lbs of steam, thus, the column $S_{56}$ outputs 5 lbs of steam, and the only combination available is $S_5$ outputting 2 lbs of steam and boiler 6 outputting 3 lbs of steam. The cost associated with the respective boilers are added to derive a total cost, i.e., $C_{5a}+C_{6a}=C_{56a}$. That results in a single point on the $T_{56}$ cost curve and is shown in the $T_{56}$ table, or solution table $T_{56}$. To output 6 lbs of steam from the combination, boiler 5 can output 2 lbs of steam in which case boiler 6 outputs 4 lbs of steam or boiler 6 outputs 3 lbs of steam and boiler 5 outputs 3 lbs of steam. No other combination is realizable given the minimum output of both boilers and the desired output, that is 6 lbs of steam. The costs associated with boiler 5 running at 2 lbs of steam is $C_{5a}$ and the cost associated with running boiler 6 at 4 lbs of steam is $C_{6b}$, the sum being the total cost which is $C_{56b}$. The other alternative is when boiler 5 and boiler 6 are each outputting 3 lbs resulting in the desired output total of 6 lbs of steam. The cost associated with running boiler 5 with this specified output is $C_{5b}$ and the cost associated with operating boiler 6 at 3 lbs of steam is $C_{6a}$, resulting in a total cost of $C_{56c}$. The total costs for 6 lbs output of steam are examined, i.e., $C_{56b}$ is compared with $C_{56c}$ and the lowest value selected. In this example the total costs marked with an asterisk are assumed to be the lowest cost and thus form the next point in the $T_{56}$ table. Thus the second line contains the point $S_{56}$ at 6 lbs of total steam output from the boiler 5 and 6 combination and the total cost being $C_{56c}$. The individual values of steam between $S_5$ and $S_6$ are also kept in the $T_{56}$ table. The process continues for the next point or 7 lbs of output from the combination and in this case $C_{56e}$ is the lowest cost of the three and thus this particular point of information is stored in the $T_{56}$ table and continues until the total combinations are performed. The total output from the combinations can only be 90 lbs, i.e., $M_5$ and $M_6$, or $40+50=90$. Once all the points are determined the $T_{56}$ cost curve is completed. Then the $T_{56}$ cost curve is combined with the cost curve for boiler 4 resulting in the $T_{456}$ cost curve or $T_{456}$ solution table. This combination is then combined with boiler 3, . . . until finally a total combination of boilers 1–6 is performed, resulting in five solution tables $T_{123456}$, $T_{23456}$, $T_{3456}$, $T_{456}$, and $T_{56}$. Once the total steam demand is known a fast table lookup is performed and the outputs of each individual boilers are determined from the solution tables and outputted (to the operator for a recommendation or automatically to the boilers, as discussed above).

In an alternative approach the optimal cost curve (or solution table for boilers 2 and 3 can be generated and an optimal solution, optimal cost curve for boilers 5 and 6 can be generated. Then the boiler 23 combination can be combined with boiler 1 and the boiler 56 combination can be combined with boiler 4 resulting in an $T_{123}$ table and an $T_{456}$ table, respectively. Finally the $T_{123}$ table and the $T_{456}$ table can be combined which results in a total solution of $T_{123456}$ solution table. This approach takes up less memory but requires slightly more processing time. The global tables referred to above would include various combinations eliminating first boiler 1, then boiler 12 . . . . The number of iterations for the method of the present invention as compared with classical methods which require solution of arrays is in the order of 1:10,000,000 times faster.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. A method for allocating a demanded amount of power to a plurality of power output apparatus, each power output apparatus having a cost curve associated therewith, such that each of the power output apparatus supplies a portion of the demanded power wherein a total of the power outputted from the plurality of power output apparatus equals the amount of the demanded power, and such that the total power outputted from the plurality of power output apparatus is an optimal cost efficient, the method comprising the steps of:
   a) entering data for each of the power output apparatus into a controller, the data providing information about each of the power output apparatus;
   b) generating optimum, solutions by parts for all valid possible output power demands, within output power bounds of each of the power output apparatus, the solutions indicating the portion of power each power output apparatus is to supply to provide the total power demanded at optimal cost efficiency;
   c) storing the solutions in tables within a storage unit of the controller;
   d) upon receipt of a demand for power, performing a search of the solution tables to obtain the amount of power each power output apparatus is to supply, the total of the amounts of power from each power output apparatus being equal to the amount of power demanded at optimal cost efficiency; and
   e) outputting control signals to each of the power output apparatus, the control signals being indicative of the amount of power to be supplied.

2. A method for allocating a demanded amount of power according to claim 1, wherein the number of power output apparatus is N, the step of generating solution by optimization by parts comprises the steps of:
   a) combining characterization data of a first power output apparatus to characterization data of a second power output apparatus to yield an optimal characterization of the first and second power output apparatus combination;
   b) if N is greater than 2, combining characterization data of a next power output apparatus to the optimal characterization of the combination of the previous combining operation, otherwise proceeding to step (d);
   c) repeating step (b) until all N power output apparatus have been optimally combined, thereby yielding an optimally combined combination of all N power output apparatus;
   d) exiting the step of generating.

3. A method of allocating a demanded amount of power according to claim 2, further comprising the steps of:
   combining all combinations of N power output apparatus and omitting predetermined ones of the power output apparatus, yielding a global allocation.

4. A method for allocating a demanded amount of power according to claim 3, wherein the controller is a process control system.

5. A method for allocating a demanded amount of power according to claim 4, wherein the control signals are set points.

6. A method for allocating a demanded amount of power according to claim 3, wherein the step of performing a search comprises the steps of:
   a) upon receipt of a demand for power, performing a search of the solution tables to obtain the amount of power each power output apparatus is to supply, the total of the amounts of power from each power output apparatus being equal to the amount of power demanded at optimal cost efficiency;
   b) outputting the recommended solutions obtained from the solution tables;
   c) waiting for an operator input to proceed; and
   d) if the operator input to proceed is not inputted, waiting for an operator input to supply manually selected allocations thereby overriding the recommended solutions.

7. A method for allocating a demanded amount of power according to claim 6, further comprising the steps of:
   a) monitoring the demanded amount of power; and
   b) if the amount of power demanded is changed, proceeding to step (a) of claim 6, otherwise proceeding to step (a).

8. A method for allocating a demanded amount of power according to claim 2, wherein the steps of combining are performed x-at-a-time, where x is equal to or greater than two (2).

9. A method for allocating a demanded amount of power according to claim 3, wherein the steps of combining are performed x-at-a-time, where x is equal to or greater than two (2).

* * * * *